Patented July 20, 1948

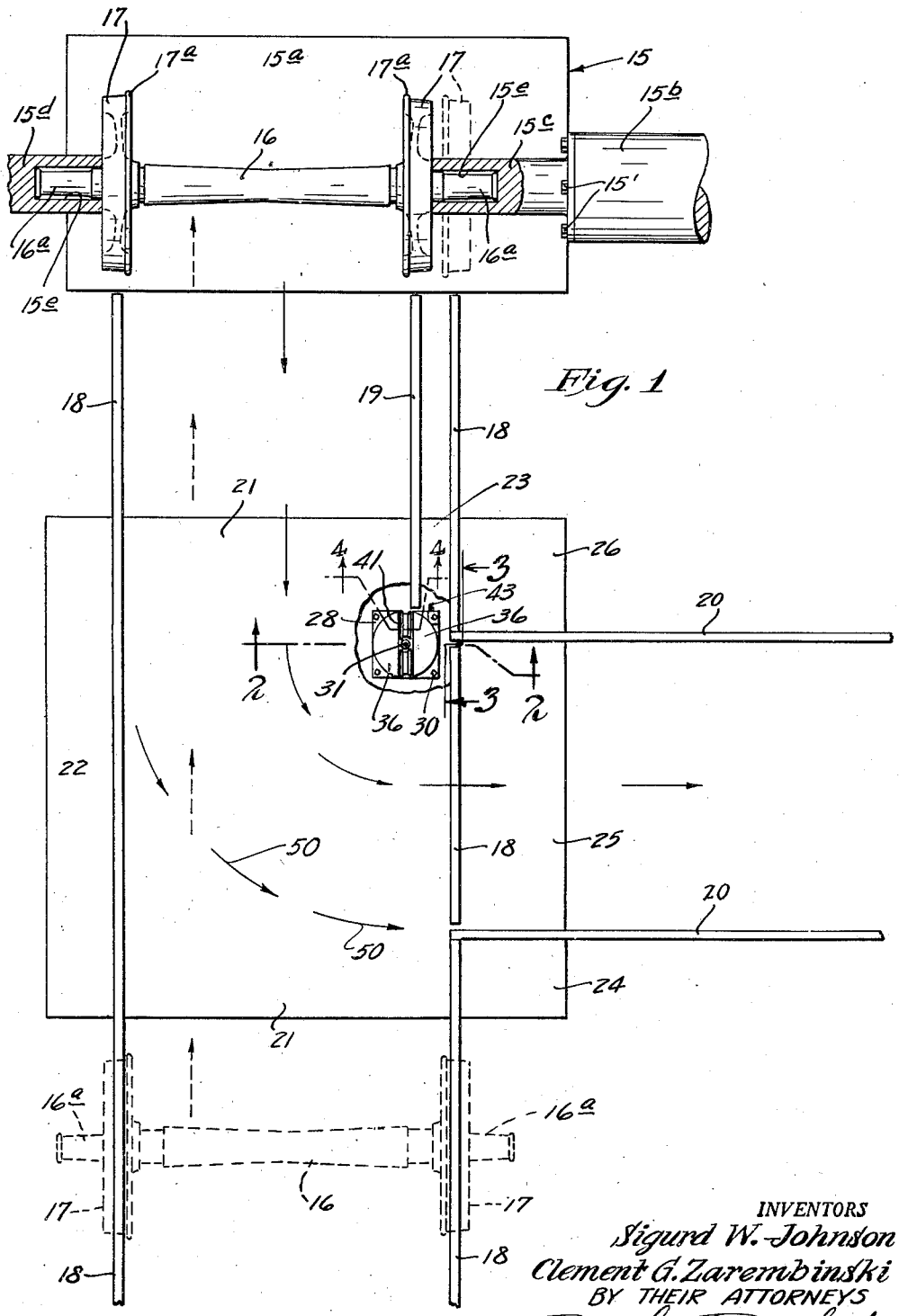

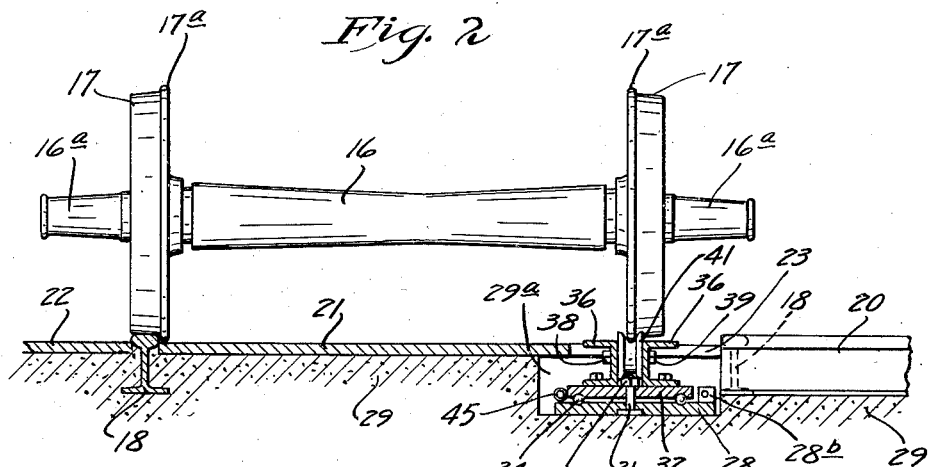
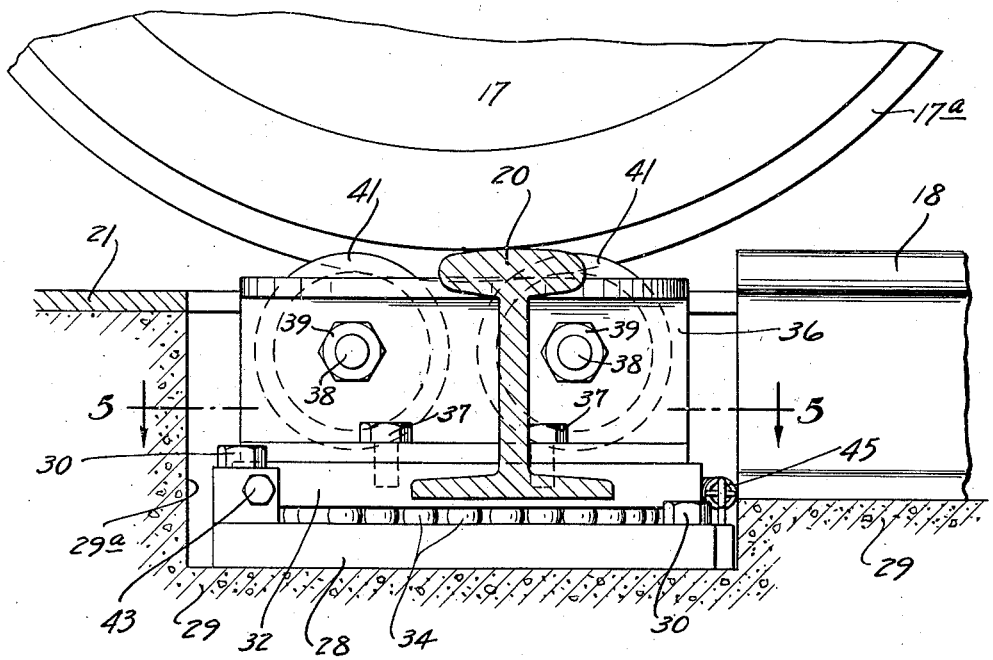

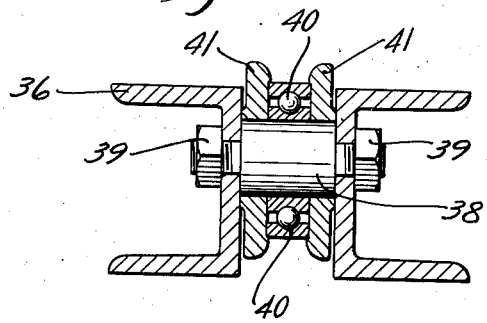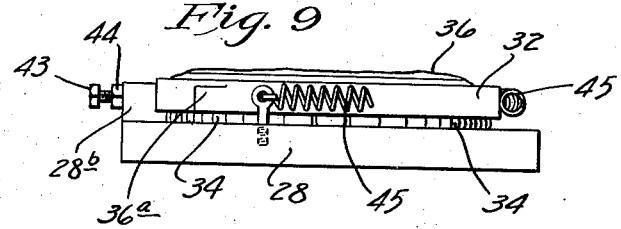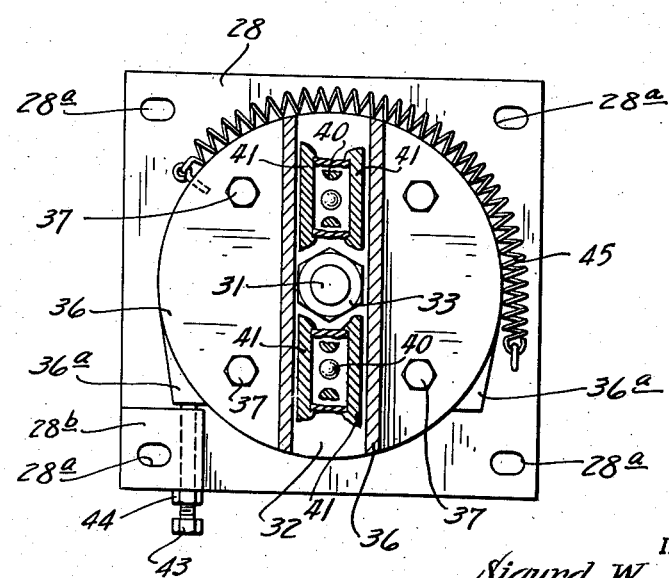

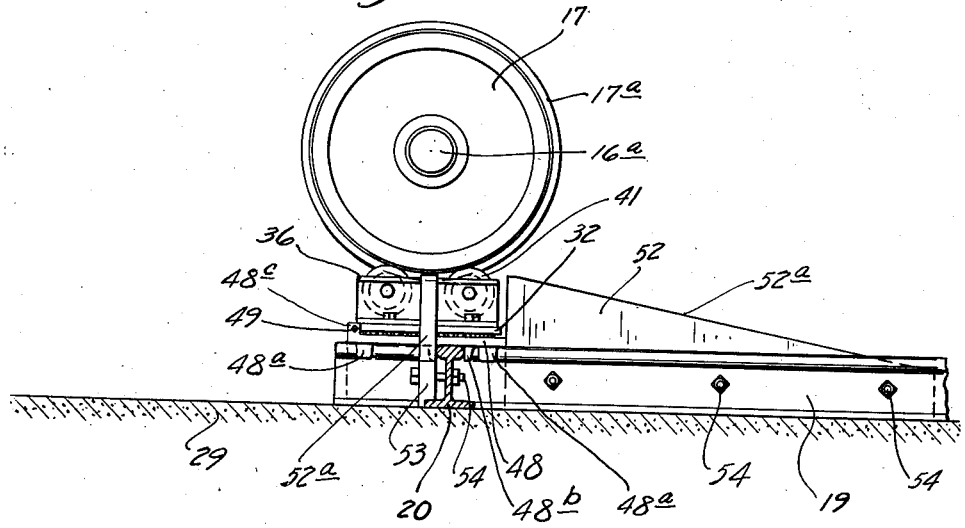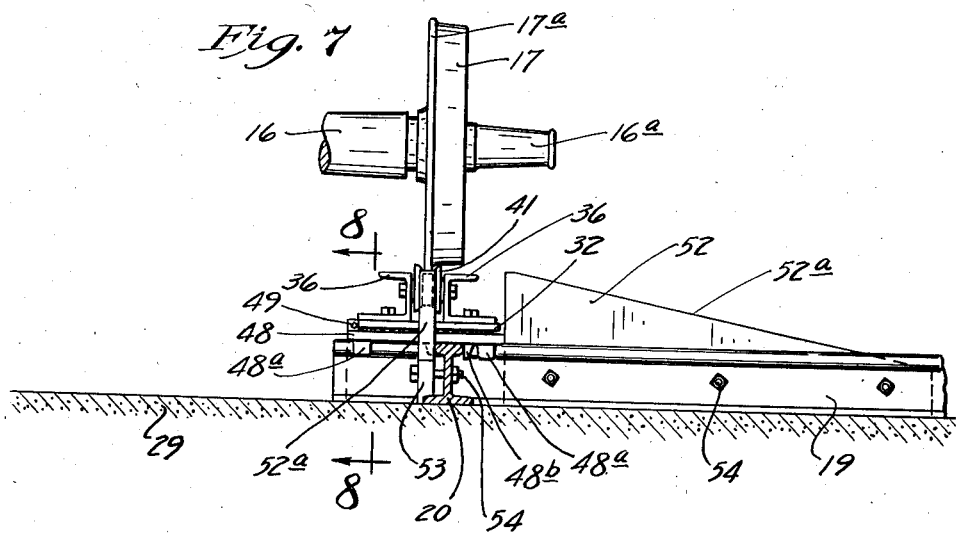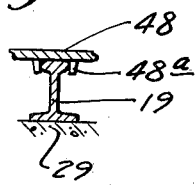

2,445,436

UNITED STATES PATENT OFFICE 2,445,436

DEVICE FOR HANDLING, PROGRESSING, AND TURNING A WHEEL-EQUIPPED AXLE

Sigurd W. Johnson, Minneapolis, and Clement G. Zarembinski, St. Paul, Minn.

Application February 5, 1945, Serial No. 576,346

14 Claims. (Cl. 238—1)

This invention relates to a structure and mechanism for handling, progressing and turning a wheel-equipped axle. While the invention is applicable to various kinds of wheels and axles, in the embodiment of the invention illustrated it is applied to a pair of railway wheels and the axle on which they are carried. It is customary to have a pair of wheels placed in a certain spaced relation on an axle and to then bring the axle and wheels into substantial axial alinement with a pressing means adapted to press the wheels into final position on said axle and in positions closer together. It is also customary to roll the wheels and axle to said pressing means on a pair of rails and to roll the wheels and axle away from said pressing means on a pair of rails, one of the rails of said first mentioned pair constituting a rail of said second mentioned pair. Said axle and wheels are quite heavy and it is quite a task to turn the same to have them roll or move in different directions. Heretofore it has been necessary to use a rather large turntable having rails for carrying each of said wheels, the rails on said turntable being adapted to come into alinement with other pairs of rails.

It is an object of this invention to provide a simple, comparatively small and efficient means whereby a wheel-carrying axle can be easily and conveniently turned and rolled from one pair of rails on to a second pair of rails extending at an angle to said first mentioned rails.

It is a further object of the invention to provide means for turning a wheel-equipped axle or similar device comprising a revoluble member disposed adjacent one rail of each of intersecting pairs of rails, said member having means adapted to be alined substantially with either of said rails and to receive, support and stop the movement of one of said wheels along one of said rails whereby the momentum of the other wheel on said axle causes it to leave its rail and swing in an arc thus turning said revoluble member and first mentioned wheel together with means for stopping the movement of said member and of said first mentioned wheel when said wheels come substantially into alinement with the intersecting pair of rails whereupon the impact against said stop causes said first mentioned wheel to leave said means and said wheels to roll onto said intersecting pair of rails.

It is another object of the invention to provide a device for turning a wheel-equipped axle or similar structure comprising a member adapted to be secured in position adjacent one rail of one pair of rails and adjacent one rail of a second pair of rails extending at an angle to said first mentioned pair, a second member carried by said first mentioned member and rotatable thereon about a vertical axis, said second member carrying means comprising members rotatable about horizontal axes and adapted to be brought by rotation of said second member into substantial alinement with one of each of said pairs of rails and adapted to receive and stop the movement of one of said wheels along its rail whereby said axle and wheels are turned and transferred from said first pair of rails to said second pair of rails.

It is still another object of the invention to provide a structure for handling and turning a wheel-equipped axle and for moving it toward and from a pressing means comprising a pair of rails extending to said pressing means on which said wheels roll to said pressing means in one position on said axle, a second pair of rails on which said wheels roll with said axle away from said pressing means with said wheels in another position on said axle, one of the rails of said first mentioned pair also constituting one of the rails of said second pair, a third pair of rails extending at an angle to said first mentioned pairs, together with a comparatively small rotating member disposed adjacent one of the rails of said second and third pairs having means for receiving, supporting and stopping the movement of one of said wheels along said second pair of rails whereby said axle and wheels are turned and caused to roll on to said third pair of rails.

It is still further an object of the invention to provide a simple and comparatively small, compact and efficient device for turning a wheel-equipped axle comprising a stationary base member, a second member secured thereto and revoluble thereon about a vertical axis, said second member carrying a plurality of spaced and longitudinally alined rollers adapted to receive and support a wheel when rolled thereon from an adjacent rail, together with stops for limiting the rotating movement of said first mentioned member.

These and other objects and advantages of the invention will be fully set forth in the following description made in connection with the accompanying drawings in which like reference characters refer to similar parts throughout the several views and in which:

Fig. 1 is a plan view of the invention also showing a wheel-equipped axle and a pressing means part of which is shown in horizontal section, some parts being shown in different positions in dotted lines;

Fig. 2 is a vertical section taken substantially on line 2—2 of Fig. 1, as indicated by the arrows, a wheel-equipped axle being shown in front elevation;

Fig. 3 is a view, partly in section and partly in elevation, taken on the line 3—3 of Fig. 1;

Fig. 4 is a partial vertical section taken on line 4—4 of Fig. 1, as indicated by the arrows;

Fig. 5 is a horizontal section taken substantially on line 5—5 of Fig. 3, as indicated by the arrows;

Fig. 6 is a view in side elevation showing a modified construction;

Fig. 7 is a view in elevation as seen from the right of Fig. 6;

Fig. 8 is a vertical section taken substantially on line 8—8 of Fig. 7, as indicated by the arrows; and Fig. 9 is a vertical section taken substantially on the same plane as Fig. 2 showing a spring used in the device.

Referring to the drawings, a device for handling a wheel-equipped axle or truck is disclosed. A press or pressing means 15 is shown having a base 15a, a movable head 15b having an axle-receiving portion or bracket 15c secured thereto by headed bolts 15'. A stationary head or plunger 15d is also shown. An axle 16 has journal portions 16a at its ends, wheel-receiving portions between said journal portions and shoulder-forming enlargements 16b. The axle 16 carries the wheels 17 having peripheral flanges 17a thereon. The wheels 17 are first placed on the axle 16 with light pressure as by hand, as shown by dotted lines in Fig. 1. In this initial position of wheels 17 they are adapted to roll and move on a pair of rails 18. The flanges 17a, as is customary, are disposed at the inner or adjacent sides of rails 18. In practice the wheel-carrying axle 16 will be moved from a convenient point on rails 18 to the press 15. The wheels and axle will be brought into concentric or axial relation with the members 15c and 15d and said members will be moved so that the journal portions 16a will be received in the bores or chambers 15e. The movable head 15b will now be moved and the wheels will be brought to final position on the axle, as shown in full lines at the top of Fig. 1. The part of the axle receiving the wheels is of slightly greater diameter than the bore of the wheel hubs so that the wheels are pressed on the axle with great force. They are thus permanently attached. The wheel-carrying axle now has the wheels in position to roll on a pair of rails constituting one of the rails 18 and a rail 19 and the wheels and axle are rolled away from the press 15 on said latter pair of rails.

A third pair of rails 20 is provided and while these rails could extend at various angles to the rails 18, they are shown as extending substantially at a right angle. Plates or platforms 21, 22, 23, 24, 25 and 26 are disposed adjacent rails 20 and between and adjacent the rails 18 at the portions thereof near rails 20. The top surfaces of plates 21 to 26 are in a plane a short distance below the tops of the rails 18, as shown in Fig. 2.

A turning device is provided and comprises a base member 28 which will be secured in position adjacent the end of rail 19 remote from press 15 and adjacent the end of one of the rails 20. As shown in Fig. 2, member 28 rests on a horizontal surface some distance below the plates 21 and will be secured to the concrete foundation 29 shown as underlying plates 21 to 26 and in a recess 29a in said foundation. Plate 28 will be secured by suitable bolts 30 passing through the elongated holes or slots 28a disposed adjacent the corners of plate 28. A bolt 31 has its head disposed in a recess in the bottom of plate 28 and extends vertically from said plate and through a second plate 32. Plate 32 is held in position by a nut 33 threaded on the top of bolt 31. Plate 32 is revoluble about bolt 31 and rotates on bearings 34 illustrated as of the ball type running in annular grooves or races formed in the top of plate 28 and the bottom of plate 32. Secured to the top of plate 32 are oppositely disposed channel members 36, the same having semi-circular bottom flanges secured to plate 32 by headed bolts 37. The top flanges of members 36 are also shown as semi-circular, as illustrated in Fig. 1. Studs 38 have central portions disposed between the vertical webs of the channel members 36 and have reduced threaded portions extending through said webs and equipped with nuts 39 at the outer sides of said webs. Studs 38 carry the inner races of ball bearings 40, the outer races being formed in the central cylindrical portions of rollers 41 having independent side flanges of greater diameter than said center portions, said side flanges being shown as having surfaces curving outwardly and upwardly from said center portions. It is important to note that the flanges 41 are journalled on the stud 38 for rotary movements independently of one another and the other race of the ball bearings 40 so as to reduce friction to a minimum when the wheel flanges roll thereagainst. Also, it will be noted that the flanges 41 close the sides of the ball bearing set and overlap the marginal edge portions of the outer races thereof to prevent dirt from entering the bearing. Rollers 41 are thus of the groove type and revoluble on the bearings 40. As clearly shown in Fig. 3, there are two of the rollers 41 and these are spaced a short distance apart with their axes in the same horizontal plane. As shown in Figs. 2 and 3, the rollers 41 have their top portions some distance above the top surface of the top flanges of channels 36. Plate 28 has a corner portion or post 28b upstanding therefrom and a threaded bolt 43 extends through post 28b and is disposed so that its end projects somewhat beyond the inner side of said post. Bolt 43 is equipped with a locking nut 44. Plate 32 is provided with a pair of projecting lugs 36a. As shown in Fig. 5, one lug 36a is adapted to engage the end of bolt 43 in one position of plate 32 and the other lug 36a is adapted to engage one side of post 28b in another position of plate 32. Said positions are approximately 90 degrees apart in the revolution of plate 32.

The turning device carried by plate 28 is disposed, as shown in Fig. 1, so that the longitudinal center line of the alined rollers 41 is approximately alined with or at a slight distance at one side of rail 19 and plate 32 is adapted to be rotated through approximately 90 degrees so that the longitudinal center line of the rollers 41 will have the same relation as to the adjacent rail 20. Preferably a tensile coiled spring 45 will have one end secured to plate 28 and its other end secured to plate 32 and will act to normally move plate 32 to the position shown in Fig. 1 (see Fig. 9). It will be noted that there is a break or space in the rail 18 adjacent the ends of rails 20.

In operation as the wheel-carrying axle moves from the press 15, the wheel 17, which runs on rail 19, will move on to the turning device and its peripheral flange 17a will roll on to the rollers 41 so that said wheel takes the position, as shown in Fig. 3, with said peripheral flange disposed in the grooves of rollers 41 and supported thereby. When said wheel thus comes into position on rollers 41 its bodily movement or its movement longitudinally of rail 19 is stopped as the rollers 41 revolve under the rotating impulse of wheel 17. It thus has no appreciable friction on rollers 41. As said wheel comes into position on the rollers 41 and is thus stopped thereby, the inertia or momentum of the other wheel 17 causes it to leave its rail 18 and swing in an arc indicated by the arrows 50. As said other wheel thus swings it turns the wheel on the turning device and thus the rollers 41 and plate 32 about the axis of bolt 31. Just before the wheels come into alinement with the rails 20, one lug 36a engages the end of bolt 43. In practice the bolt 43 has been adjusted so that it is engaged by lug 36a when plate 32 has moved through substantially 85 degrees. When plate 32 and rollers 41 carried thereby are brought to a sudden stop by engagement of lug 36a with bolt 43, the shock or impact causes the wheel to leave rollers 41 and move therefrom on to the adjacent rail 20. Both wheels are now in alinement with rails 20 respectively and the wheel which left the rail 18 moves on to the other rail 20 and the wheel-carrying axle rolls on rails 20 to the desired point. The movement of the wheel on to the turning device, the subsequent swinging movement of the other wheel and the movement of the wheels on to the rails 20 are entirely automatic and the truck or wheel-equipped axle is easily, efficiently and quickly directed to the desired place. The laborious movement of the truck or wheel-carrying axle by hand or the operation of a turn-table are thus eliminated.

In Figs. 6 to 8 a modified form of the device is shown. In this form plates 52 and 53 of trapezoidal shape are provided having upwardly inclined surfaces 52a and these are bolted by headed and nutted bolts 54 against the inner sides of rail 19 and the adjacent rail 20 respectively. Plates 52 and 53 rest on the foundation 29 and have one side engaging the head of the rails to which they are secured and said plates have a recess at the bottom thereof fitting over the edge portion of the flange of the rails to which they are secured. The turning device is disposed at a higher level so that the top surfaces of channels 36 will be about the same distance below the uppermost portions of surfaces 52a as they were below the tops of the rails 19 and 20 in the form already described. Rail 19 can be extended and form a support for plate 48 corresponding to plate 28 already described. Plate 48 has depending lugs 48a which can be disposed at the sides of the head of rail 19. One side of plate 48 will engage or abut the vertical end of the plate 52 and said plate can also rest upon the top of the adjacent rail 20 which can be extended underneath said plate. Plate 48 will have one or more lugs 48b which will engage the side of rail 20. Plate 48 has a plate 32 and other parts carried thereby secured to it in the same manner as plate 32 already described is secured to plate 28. Plate 48 is also provided with a corner post 48c, similar in all respects to corner post 28b and having a stop screw 49 therein similar in all respects to stop screw 43 already described. The structure otherwise than as noted will be the same as shown in Figs. 1 to 5.

In operation the wheel 17 will roll away from the press 15 on rail 19 and one rail 18 and the wheel on rail 19 will engage the top or upwardly inclined surface of plate 52 with its flange 17a so that said wheel will roll upon plate 52 and on to the rollers 41. The wheel will be stopped, as already described, and the wheel rolling on the rail 18 will swing in an arc, as already described, turning plate 32, rollers 41 and the wheel carried thereby until the lug 36a on plate 36 engages screw 49. This screw will be set in the same position, as already described, for screw 43. When the lug 36a engages screw 49, the impact of the stop will cause the wheel to leave the rollers 41 and it will move on to the top surface of plate 53 and the other wheel which has swung in an arc will move on to the other rail 20. The wheel will engage the top of plate 53 with its peripheral flange, which flange will roll on said plate until the tread of the wheel engages the top of rail 20. Both wheels will then be on rails 20 and will roll to the desired place thereon. It will be noted that the top surfaces of plates 52 and 53 at their lowest points extend some distance below the top surfaces of rails 19 and 20 so that the wheel can easily engage and roll on the inclined surfaces of plates 52 and 53.

From the above description it will be seen that I have provided a simple, small and very efficient turning device for turning a wheel-equipped axle or truck. The device is fairly simple in construction and is easily made and installed. The device acts automatically and the wheel-carrying axles or trucks are thus very easily, quickly and efficiently handled. A great deal of labor is saved by the device and it is quite inexpensive as compared to apparatus formerly required. It may be stated that the operation is more effective when the stop screws 43 and 49 are set to stop plate 32 at slightly less than 90 degrees even though the tracks be at a 90 degree angle. The swinging wheel has enough momentum to move through the full 90 degrees and it correctly positions or alines the wheel on the turning device. The device has been amply demonstrated in actual practice and found to be very successful and efficient and is being commercially made.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. Apparatus for turning a pair of railway wheels mounted in spaced relation on a common axle and which wheels have peripheral flanges at their adjacent sides only, said apparatus comprising, rails on which said wheels move, a member revoluble on a vertical axis and having means alined with one of said rails adapted to receive and stop the movement of one of said wheels in a direction longitudinally of said rail, whereby the momentum of the other wheel causes it to swing in an arc concentric with the vertical axis of revolution of said member and turn said revoluble member and first mentioned wheel, wheel supporting means underlying the arcuate path of travel of said other wheel and supporting the same during its arcuate travel, and means for stopping the revolution of said member at the desired point whereby the impact of said stopping causes said wheel to leave said means.

2. Apparatus for turning a pair of railway wheels mounted in spaced relation on a common axle and which wheels have peripheral flanges at their adjacent sides only, said apparatus comprising, rails on which said wheels roll, a member revoluble on a vertical axis and having means alined with one of said rails adapted to receive and stop the movement of one of said wheels in a direction longitudinally of said rail and comprising spaced revoluble members adapted to support the periphery of said wheel whereby the momentum of the other wheel causes it to swing in an arc about the vertical axis of and turn said revoluble member, wheel supporting means underlying the arcuate path of travel of said other wheel and supporting the same during its arcuate travel, and means for stopping the revolution of said member at the desired point upon which said first mentioned wheel leaves said revoluble members.

3. The structure set forth in claim 2 and means for rotating said revoluble member to its original position.

4. Apparatus for turning a pair of railway wheels mounted in spaced relation on a common axle and which wheels have peripheral flanges at their adjacent sides only, said apparatus comprising, rails on which said wheels roll with said axle, a member revoluble on a vertical axis and having means alined with one of said rails adapted to receive and stop the movement of one of said wheels in a direction longitudinally of said rail, whereby the momentum of the other wheel causes it to swing in an arc concentric with the vertical axis of revolution of said member and turn said member, wheel supporting means underlying the arcuate path of travel of said other wheel and supporting the same during its arcuate travel, and stops for limiting the revolution of said member in opposite directions.

5. Apparatus for turning a pair of railway wheels mounted in spaced relation on a common axle and which wheels have peripheral flanges at their adjacent sides only, said apparatus comprising, rails on which said wheels roll, a base member, a second member revoluble about a vertical axis mounted on and secured to said base member, a pair of rollers mounted in said second member and having their peripheries longitudinally alined with one of said rails, said rollers being adapted to receive and support the periphery of one of said wheels and to stop the movement thereof longitudinally of said rail whereby the momentum of said other wheel will cause it to swing in an arc and turn said second member substantially concentric with the vertical axis of revolution of said second member, wheel supporting means underlying the arcuate path of travel of said other wheel and supporting the same during its arcuate travel, and means for stopping the rotation of said second member and swinging movement of said other wheel at the desired point whereby said wheel leaves said rollers.

6. The structure set forth in claim 5 and a spring secured to said base member and second member acting to return said second member to said first mentioned position.

7. Apparatus for turning a pair of railway wheels mounted in spaced relation on a common axle and which wheels have peripheral flanges at their adjacent sides only, said apparatus comprising, a pair of rails on which said wheels roll, a second pair of rails extending at an angle to said rails, a revoluble member having a vertical axis of rotation substantially at the point where one of each of said pairs of rails would intersect, means carried by said member adapted to aline with said last mentioned rails for receiving, supporting and stopping the progressive movement of one of said wheels whereby the momentum of said other wheel on said axle will cause it to swing in an arc about the axis of the revoluble member and come into alinement with the other rail of said second pair, wheel supporting means underlying the arcuate path of travel of said other wheel and supporting the same during its arcuate travel, and means for stopping the rotation of said member when said means is approximately alined with said first mentioned rail of said second pair.

8. Apparatus for turning a pair of railway wheels mounted in spaced relation on a common axle, said wheels having peripheral flanges at one side only thereof, having in combination, a pair of rails on which said wheels roll with said flanges at the adjacent sides of said rails, a supporting surface between said rails, a member revoluble about a substantially vertical axis, which axis is disposed substantially in the plane of movement of a flange of one of said wheels, means carried by said member adapted to aline with, receive and support the flange of one of said wheels and to stop the bodily movement of said wheel whereby the inertia of the other wheel on said axle causes it to swing in an arc on said surface and turn said member about its axis with said means and first mentioned wheel, and a stop for stopping the movement of said member and means whereby the impact against said stop causes said first mentioned wheel to leave said means.

9. Apparatus for turning a spaced pair of wheels on a common axle, said wheels having peripheral flanges at adjacent sides thereof only, said apparatus comprising, a pair of rails on which said wheels roll with said flanges at the adjacent sides of said rails, a supporting surface between said rails, a member revoluble about a substantially vertical axis, which axis is disposed substantially in the plane of movement of a flange of one of said wheels, a pair of spaced revoluble rollers carried by said member having grooves in their peripheries in longitudinal alinement and adapted to aline with the rail on which said wheel runs and to receive and support said wheel and stop the bodily movement of said wheel whereby the momentum of the other wheel causes it to swing in an arc on said surface and turn said member with said rollers and said first mentioned wheel, wheel supporting means underlying the arcuate path of travel of said other wheel and supporting the same during its arcuate travel, and a stop for stopping the movement of said member whereby the impact against said stop causes said first mentioned wheel to leave said rollers.

10. Apparatus for turning a pair of railway wheels mounted in spaced relation on a common axle and which wheels have peripheral flanges at their adjacent sides only, said apparatus comprising, a pair of rails on which said wheels respectively roll, a second pair of rails extending substantially perpendicular to and adjacent said first mentioned rails, a member disposed adjacent one of the rails of each of said pairs and revoluble about a vertical axis disposed substantially at the point where said last mentioned rails would intersect, a pair of spaced rollers carried by said member, said rollers being revoluble about horizontal axis and having peripheral grooves in alinement with each other, said grooves being adapted to come into substantial alinement with either of said last mentioned rails and to receive support and stop the forward movement of one of said wheels whereby the momentum of the other of said wheels causes it to swing in an arc about the said axis of said member and turn said member and rollers to bring the latter with their grooves into substantial alinement with one of said second pair of rails, wheel supporting means underlying the arcuate path of travel of said other wheel and supporting the same during its arcuate travel, and a stop for stopping said member a short distance before said grooves come into such alinement whereby the impact against said stop will cause said wheel to leave said rollers and said wheels will roll on to said second mentioned pair of rails.

11. Apparatus for handling and turning a pair of railway wheels mounted in spaced relation on a common axle and for transferring said wheels and axle from a wheel pressing means, said wheels having peripheral guide flanges at their adjacent sides only, said apparatus comprising a pair of rails on which said wheels respectively roll toward said pressing means with said wheels in one position on said axle, a second pair of rails on which said wheels respectively roll away from said pressing means with said wheels closer together on said axle, said second pair of rails including one of said first mentioned pair of rails, a third pair of rails extending at an angle to said first mentioned pairs, a member secured in stationary position adjacent one of the rails of said second pair and one of the rails of said third pair, a member carried by said first mentioned member and rotatable thereon about a vertical axis disposed substantially at the point where said last mentioned rails would intersect, means comprising a member rotatable about a horizontal axis carried by said second member adapted to aline with either of said last mentioned rails and constructed and arranged to receive support and stop the movement of one of said wheels along one of said rails whereby the momentum of the other of said wheels will cause it to swing in an arc about said axis and will turn said second member and means with said first mentioned wheel, and means for stopping the rotation of said member and first mentioned wheel when said means come into approximate alinement with one of said third pair of rails, wheel supporting means underlying the arcuate path of travel of said other wheel and supporting the same during its arcuate travel, whereby the impact against said stop will cause said first mentioned wheel to leave said last mentioned member and said wheels will roll on to said third pair of rails.

12. Apparatus for turning a pair of wheels on a common axle comprising a base member, a second member journalled on the base member for rotation about a vertical axis, a pair of roller elements journalled on the said second member on horizontally spaced parallel axes, the axes of the said roller elements being substantially equally spaced on opposite sides of the vertical axis of the second member, said spaced roller elements being adapted to jointly support one of said pair of wheels and permit free turning thereof on its own axis while the said pair of wheels is turning about the vertical axis of the second member, and spaced stops for limiting rotary movement of the second member in opposite directions of rotation.

13. A device for turning a pair of railway wheels mounted on a common axle having in combination, with pairs of rails extending at an angle to each other, a base member, a second member secured to and revoluble on said member about a vertical axis, means carried by said second member adapted to aline approximately with one rail of each of said pairs thereof respectively and constructed and arranged to receive a wheel from one such rail and support and stop the progressive movement of said wheel, members having inclined surfaces extending upwardly from the tops of said one rail of each pair thereof to adjacent said means and adapted to have a portion of the periphery of said wheel roll thereon to said means, and means for securing said last mentioned members to said rails.

14. A device for turning a pair of railway wheels mounted on a common axle having in combination, with pairs of rails extending at an angle to each other, a base member, a second member secured to and revoluble on said member about a vertical axis, a pair of longitudinally alined rollers carried by said second member revoluble about horizontal axis adapted to receive, support and stop the progressing movement of a wheel, said rollers being adapted to approximately aline with one rail of each pair thereof respectively in the revolution of said second member, plates secured to said rails having top surfaces inclining upwardly from adjacent the tops of said one rail of each pair thereof to adjacent said rollers, on which surfaces said wheel is adapted to roll, means for securing said plates to said rails, and means for limiting the rotating movement of said second member.

SIGURD W. JOHNSON.
CLEMENT G. ZAREMBINSKI.

REFERENCES CITED

The following references are of record in the file of this patent:

UNITED STATES PATENTS

| Number | Name | Date |
| --- | --- | --- |
| 1,394,489 | Funkhouser et al. | Oct. 18, 1921 |
| 1,446,498 | Freshwater et al. | Feb. 27, 1923 |
| 1,504,558 | Hawley | Aug. 12, 1924 |
| 1,789,647 | Flynn | Jan. 20, 1931 |

FOREIGN PATENTS

| Number | Country | Date |
| --- | --- | --- |
| 247,509 | Germany | June 1, 1912 |